United States Patent
Lee

(10) Patent No.: US 12,216,577 B2
(45) Date of Patent: Feb. 4, 2025

(54) APPARATUS FOR MANAGING CACHE LOSS AND OPERATION METHOD THEREOF

(71) Applicant: Samsung Electronics Co., Ltd., Suwon-si (KR)

(72) Inventor: Junwoo Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 232 days.

(21) Appl. No.: 17/882,159

(22) Filed: Aug. 5, 2022

(65) Prior Publication Data

US 2023/0130911 A1    Apr. 27, 2023

Related U.S. Application Data

(63) Continuation of application No. PCT/KR2022/010386, filed on Jul. 15, 2022.

(30) Foreign Application Priority Data

Oct. 25, 2021   (KR) ................ 10-2021-0143020
Nov. 3, 2021   (KR) ................ 10-2021-0149503

(51) Int. Cl.
    *G06F 3/06*         (2006.01)
    *G06F 12/0802*    (2016.01)

(52) U.S. Cl.
    CPC ........ *G06F 12/0802* (2013.01); *G06F 3/0604* (2013.01); *G06F 3/0656* (2013.01);
    (Continued)

(58) Field of Classification Search
    None
    See application file for complete search history.

(56) References Cited

U.S. PATENT DOCUMENTS 5,974,426 A * 10/1999 Lee ..................... G06F 11/1469
                                            714/E11.122
6,332,181 B1   12/2001   Bossen et al.
(Continued)

FOREIGN PATENT DOCUMENTS

| CN | 111581018 A | 8/2020 |
|---|---|---|
| JP | 3686562 B2 | 8/2005 |

(Continued)

OTHER PUBLICATIONS

International Search Report dated Oct. 28, 2022, issued in International Patent Application No. PCT/KR2022/010386.

(Continued)

*Primary Examiner* — Elias Mamo
(74) *Attorney, Agent, or Firm* — Jefferson IP Law, LLP

(57) ABSTRACT

A host for managing a storage device is provided. The host includes a storage host interface configured to communicate with the storage device comprising a cache and a non-volatile memory and at least one processor. The at least one processor may be configured to receive information indicating cache loss from the storage device after device reset of the storage device, suspend a data input/output operation for the storage device, transmit a buffer read command to the storage device, and receive cache information related to data remaining in the cache without being stored in the non-volatile memory before the device reset from the storage device in response to the buffer read command.

9 Claims, 10 Drawing Sheets

(52) U.S. Cl.
CPC .......... *G06F 3/0659* (2013.01); *G06F 3/0679* (2013.01); *G06F 2212/60* (2013.01); *G06F 2212/72* (2013.01)

(56) References Cited

U.S. PATENT DOCUMENTS

| | | | |
|---|---|---|---|
| 6,970,981 | B2 | 11/2005 | Kanaley |
| 2004/0103238 | A1 | 5/2004 | Avraham et al. |
| 2008/0140724 | A1 | 6/2008 | Flynn et al. |
| 2011/0238915 | A1 | 9/2011 | Kikuchi |
| 2012/0233497 | A1* | 9/2012 | Mori ................ G06F 11/1064 714/E11.023 |
| 2013/0326152 | A1* | 12/2013 | Loaiza ................ G06F 12/00 711/141 |
| 2014/0164700 | A1 | 6/2014 | Liang |
| 2014/0281677 | A1 | 9/2014 | Koike |
| 2015/0324248 | A1* | 11/2015 | Tomozaki ........ G06F 11/1076 714/807 |
| 2016/0062913 | A1 | 3/2016 | Woo et al. |
| 2016/0092223 | A1 | 3/2016 | Wang et al. |
| 2017/0177242 | A1* | 6/2017 | Park ................ G06F 12/08 |
| 2017/0228154 | A1* | 8/2017 | Liu ................ G06F 11/1441 |
| 2018/0081543 | A1 | 3/2018 | Muchherla et al. |
| 2020/0110662 | A1 | 4/2020 | Kuo et al. |
| 2020/0125495 | A1 | 4/2020 | Galbi et al. |

FOREIGN PATENT DOCUMENTS

| | | |
|---|---|---|
| JP | 2011-209892 A | 10/2011 |
| JP | 2012-190330 A | 10/2012 |
| JP | 2013-097637 A | 5/2013 |
| JP | 2014-182847 A | 9/2014 |
| KR | 10-1994-0012122 A | 6/1994 |
| KR | 10-0342802 B1 | 6/2002 |
| KR | 10-0950235 B1 | 3/2010 |
| KR | 10-2014-0133923 A | 11/2014 |
| KR | 10-2020-0038857 A | 4/2020 |

OTHER PUBLICATIONS

European Search Report dated Jul. 25, 2024, issued in European Application No. 22887292.5.

* cited by examiner

| | | | | |
|---|---|---|---|---|
| RESPONSE UPIU | | | | |
| 0<br>xx10 0001b | 1<br>Flags | 2<br>LUN | 3<br>Task tag | |
| 4<br>IID \| Command set type | 5<br>Reserved | 6<br>Response | 7<br>Status | |
| 8<br>Total EHS length (00h) | 9<br>Device information | 10 (MSB)<br>Data segment length | 11 (LSB) | |
| 12 (MSB) | 13 | 14 | 15 (LSB) | |
| Residual transfer count | | | | |
| 16 | 17 | 18 | 19 | |
| Reserved | | | | |
| 20 | 21 | 22 | 23 | |
| Reserved | | | | |
| 24 | 25 | 26 | 27 | |
| Reserved | | | | |
| 28 | 29 | 30 | 31 | |
| Reserved | | | | |
| Header E2ECRC (omit if HD=0) | | | | |
| k (MSB)<br>Sense data length | k+1 (LSB) | k+2<br>Sense data [0] | k+3<br>Sense data [1] | |
| ... | ... | ... | ... | 505 |
| k+16<br>Sense data [14] | k+17<br>Sense data [15] | k+18<br>Sense data [16] | k+19<br>Sense data [17] | |
| Data E2ECRC (omit if DD=0) | | | | |
| NOTE 1 k=32 if HD = 0 | | | | |

APPARATUS FOR MANAGING CACHE LOSS AND OPERATION METHOD THEREOF

CROSS-REFERENCE TO RELATED APPLICATION(S)

This application is a continuation application, claiming priority under § 365(c), of an International application No. PCT/KR2022/010386, filed on Jul. 15, 2022, which is based on and claims the benefit of a Korean patent application number 10-2021-0143020, filed on Oct. 25, 2021, in the Korean Intellectual Property Office, and of a Korean patent application number 10-2021-0149503, filed on Nov. 3, 2021, in the Korean Intellectual Property Office, the disclosure of each of which is incorporated by reference herein in its entirety.

BACKGROUND

1. Field

The disclosure relates to an apparatus for managing cache loss caused by device reset and an operation method thereof more particularly, the disclosure relates to a host, for managing a storage device is provided, including a storage host interface configured to communicate with the storage device comprising a cache and a non-volatile memory, and at least one processor operatively coupled with the storage host interface.

2. Description of Related Art

A storage system may include a host and a storage device. The storage device may include a non-volatile memory to permanently store data. The host and the storage device may be coupled to each other via various standard interfaces including at least one of an embedded multimedia card (eMMC) interface, a secure digital (SD) interface, a universal flash storage (UFS), a solid state drive (SSD), a small computer small interface (SCSI), or a serial attached SCSI (SAS). When the storage system is used for a mobile device, the mobile device may adopt an eMMC or UFS using a non-volatile type, NAND flash memory.

The storage device may include an internal cache to increase write and read speeds. Depending on the type of the storage device, volatile memory faster than NAND flash memory, such as static random access memory (SRAM) or dynamic random access memory (DRAM), may be used as a cache.

The above information is presented as background information only to assist with an understanding of the disclosure. No determination has been made, and no assertion is made, as to whether any of the above might be applicable as prior art with regard to the disclosure.

SUMMARY

Once the storage device stores write data in the cache according to a write command from the host, the storage device may report a write completion response to the host before the write data is written to the NAND flash memory. The host may explicitly request writing of the data stored in the cache to the NAND flash memory, that is, cache flush, using a command or a request, such as flush or sync cache.

The cache used in the storage device may be volatile, and cache data may be lost due to a power cycle, hardware reset, or software reset of the storage device. When the host resets the storage device for various reasons, such as correction of an error occurring in the storage device or the interface, data remaining in the cache of the storage device may not be preserved and thus may be lost. However, because the host has already received the write completion response from the storage device, the host may determine that the data has completely been written to the NAD flash memory.

More particularly, a file system included in the host is not aware of device reset performed in a storage driver and/or the resulting data loss in the storage device. Therefore, the file system may not immediately identify a consistency error in the storage device. When the file system continues to read/write data after the occurrence of the consistency error, the consistency error may continuously increase until before the file system accesses a data loss area of the NAND flash memory again and identifies the consistency mismatch.

In the case where cache loss in the storage device leads to a consistency error elusive to the file system, the file system may be rebooted by causing a kernel panic within a runtime. After the rebooting, the file system may check and restore an area with the consistency error by performing a file system consistency check (FSCK) before being mounted. Even when the file system is rebooted for other reasons without identifying the consistency error, the file system may perform the FSCK at a mounting time in a similar manner. In this case, when much data has been lost, the data may not be recoverable, resulting in loss of user data. More particularly, when the file system fails to be mounted due to damage to system data in the NAND flash memory or failure of file system metadata recovery, the file system may not be booted.

Aspects of the disclosure are to address at least the above-mentioned problems and/or disadvantages and to provide at least the advantages described below. Accordingly, an aspect of the disclosure is to provide an apparatus for managing cache loss caused by device reset and an operation method thereof.

Additional aspects will be set forth in part in the description which follows and, in part, will be apparent from the description, or may be learned by practice of the presented embodiments.

In accordance with an aspect of the disclosure, a host for managing a storage device is provided. The host includes a storage host interface configured to communicate with the storage device comprising a cache and a non-volatile memory, and at least one processor operatively coupled with the storage host interface. The at least one processor may be configured to receive information indicating cache loss from the storage device after device reset of the storage device. The at least one processor may be configured to suspend a data input/output operation for the storage device in response to the information indicating cache loss. The at least one processor may be configured to transmit a buffer read command to the storage device. The at least one processor may be configured to receive, from the storage device, cache information related to data remaining in the cache without being stored in the non-volatile memory before the device reset based on the buffer read command.

In accordance with another aspect of the disclosure, a storage device is provided. The storage device includes a cache, a non-volatile memory, a device interface configured to communicate with a host, and at least one processor operatively coupled with the cache, the non-volatile memory and the device interface. The at least one processor may be configured to receive a reset command from the host through the device interface, perform device reset in response to the reset command. The at least one processor may be configured to determine whether there is cache information related to data remaining in the cache without being stored in the non-volatile memory before the device reset. The at least one processor may be configured to, in the presence of the cache information, transmit information indicating cache loss to the host through the device interface. The at least one processor may be configured to receive a read command for the cache information from the host through the device interface after transmitting the information indicating cache loss. The at least one processor may be configured to transmit the cache information to the host through the device interface in response to the read command.

In accordance with another aspect of the disclosure, a method of operating a host for managing a storage device including a cache and non-volatile memory is provided. The method may include receiving information indicating cache loss from the storage device after device reset of the storage device. The method may include suspending a data input/output operation for the storage device in response to the information indicating cache loss. The method may include transmitting a buffer read command to the storage device. The method may include receiving, from the storage device, cache information related to data remaining in the cache without being stored in the non-volatile memory before the device reset based on the buffer read command.

In accordance with another aspect of the disclosure, a method of operating a storage device including a cache and non-volatile memory is provided. The method may include receiving a reset command from a host, performing device reset in response to the reset command. The method may include determining whether there is cache information related to data remaining in the cache without being stored in the non-volatile memory before the device reset. The method may include, in the presence of the cache information, transmitting information indicating cache loss to the host. The method may include receiving a read command for the cache information from the host after transmitting the information indicating cache loss. The method may include transmitting the cache information to the host in response to the read command.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 5 is a diagram illustrating a format of a response message according to an embodiment of the disclosure;

Throughout the drawings, it should be noted that like reference numbers are used to depict the same or similar elements, features, and structures.

DETAILED DESCRIPTION

The following description with reference to the accompanying drawings is provided to assist in a comprehensive understanding of embodiments of the disclosure as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Terms indicating components of a storage device and a host used in the disclosure, terms indicating messages, terms indicating information, and so on are illustratively provided, for convenience of description. Accordingly, embodiments of the disclosure are not limited to the terms described below, and other terms having equivalent technical meanings may be used.

While for convenience of description, the disclosure may use terms and names defined in a specific system standard, the disclosure is not limited by the terms and names and may be equally applied to systems conforming to other standards.

Embodiments of the disclosure will be described below with reference to the accompanying drawings. Lest it should obscure the subject matter of the disclosure, a detailed description of well-known functions and configurations will be avoided.

Figure 1:
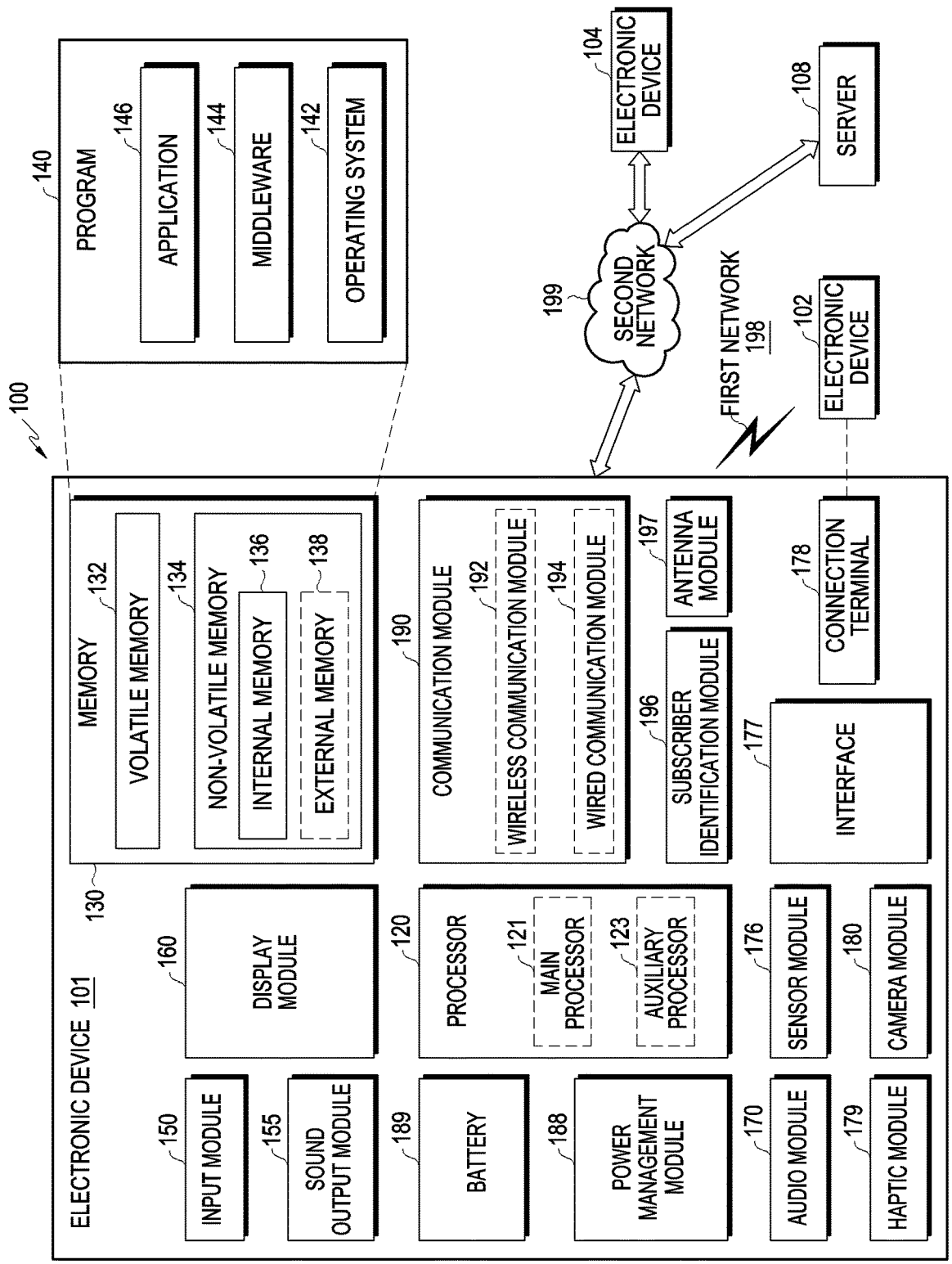
FIG. 1 is a block diagram illustrating an electronic device in a network environment according to various embodiments.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
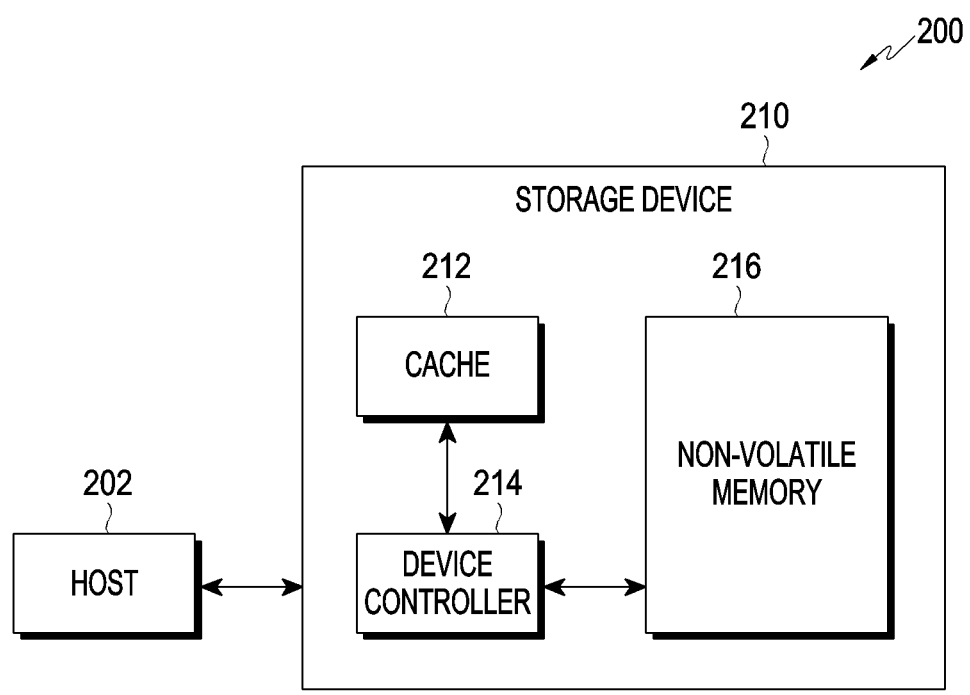
FIG. 2 is a block diagram illustrating a storage system according to an embodiment of the disclosure.

FIG. 2 is a block diagram illustrating a storage system according to an embodiment of the disclosure.

Referring to FIG. 2, a storage system 200 may include a host 202 and a storage device 210. In an embodiment of the disclosure, the storage system 200 may be included in one of computing systems (e.g., the electronic device 101), such as a personal computer, a laptop, a tablet, a smart phone, or a wearable device. In an embodiment of the disclosure, the host 202 may be the processor 120 included in the electronic device 101. In an embodiment of the disclosure, the storage device 210 may be the memory 130 included in the electronic device 101.

The host 202 may write data to the storage device 210 or read data stored in the storage device 210. For example, the host 202 may transmit a write command and write data to the storage device 210 to store the data in the storage device 210. For example, to read data stored in the storage device 210, the host 202 may transmit a read command to the storage device 210 and receive the data from the storage device 210.

In an embodiment of the disclosure, the host 202 may include a main processor (e.g., the main processor 121), such as a CPU or an AP. In an embodiment of the disclosure, the host 202 may include an auxiliary processor (e.g., the auxiliary processor 123), such as a GPU or a neural processing unit (NPU) to assist the main processor (e.g., the main processor 121).

The storage device 210 may operate under the control of the host 202. In an embodiment of the disclosure, the storage device 210 may include a device controller 214 (for example, at least one processor) and a non-volatile memory 216. The device controller 214 may operate in response to a command received from host 202. In an embodiment of the disclosure, the device controller 214 may be a processor configured to receive a write command and write data from the host 202 and store the write data in the non-volatile memory 216 in response to the write command.

In an embodiment of the disclosure, the device controller 214 may receive a read command from the host 202 and read data stored in the non-volatile memory 216 in response to the read command subsequently, the device controller 214 may transmit the read data to the host 202. In an embodiment of the disclosure, the non-volatile memory 216 may be, but not limited to, a NAND flash memory device.

In an embodiment of the disclosure, the host 202 may communicate with the storage device 210 based on a universal flash storage (UFS) interface defined by the joint electron device engineering council (JEDEC) standard. For example, the host 202 and the storage device 210 may exchange packets in the form of UFS protocol information units (UPIUs). A UPIU may include, but not limited to, various types of information defined by an interface (e.g., a UFS interface) between the host 202 and the storage device 210. For convenience of description, the terms, command, UPIU, or message may be used interchangeably, and each term has the same meaning or a different meaning according to embodiments described in the detailed description.

The storage device 210 may include a cache 212 (also referred to as cache memory) to increase write and read speeds. The cache 212 may be a temporary storage space of the storage device 210. The cache 212 may include volatile memory, such as SRAM or DRAM, faster than NAND flash to reduce an access time for both writing and reading, compared to the non-volatile memory 216. In an embodiment of the disclosure, the cache 212 may be used for some implementation-specific operations, such as execution memory and/or an address mapping table for the device controller 214.

The cache 212 is not directly accessed by the host 202, and may be an individual component of the storage device 210. The cache 212 may temporarily store write data for the non-volatile memory 216 and read data from the non-volatile memory 216. In an embodiment of the disclosure, the cache 212 may be configured not to retain valid data during a power cycle or hardware/software reset. The host 202 may explicitly request the device controller 214 to write data stored in the cache 212 to the non-volatile memory 216 (i.e., flush the cache), using a command, such as cache flush or sync cache.

Figure 3:
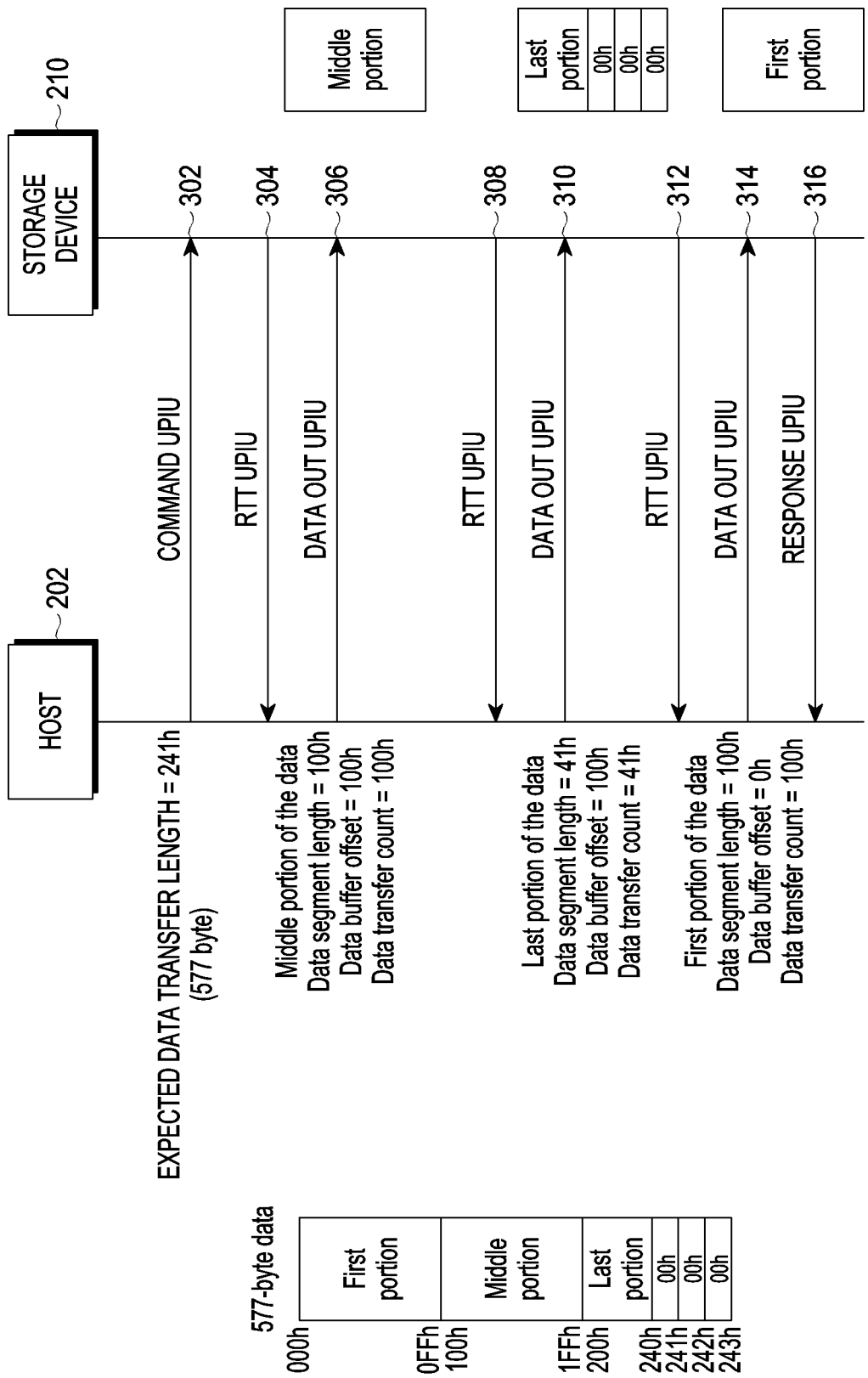
FIG. 3 is a diagram illustrating a message flow for a write procedure in a storage device according to an embodiment of the disclosure.

FIG. 3 is a diagram illustrating a message flow for a write procedure in a storage device according to an embodiment of the disclosure. As an embodiment of the disclosure, the storage device is shown configured as a UFS, by way of example.

Referring to FIG. 3, in operation 302, the host 202 may transmit, to the storage device 210, a COMMAND UPIU as a command message to request storage of write data. The COMMAND UPIU may include an expected data transmission length (e.g., 241 h) of write data (e.g., 577 bytes of data) that the host 202 wants to be stored in the non-volatile memory 216, together with information of the write request.

In operation 304, when ready to receive the write data, the storage device 210 may transmit a ready to transfer (RTT) UPIU to the host 202. In an embodiment of the disclosure, the RTT UPIU may include information about a data range that the storage device 210 is capable of receiving. In operation 306, the host 202 may transmit a data output message (e.g., DATA OUT UPIU) including at least part of the write data to the storage device 210 in response to the RTT UPIU. In an embodiment of the disclosure, the DATA OUT UPIU may include a middle portion of the write data, a data segment length (e.g., 100*h*), a data buffer offset (e.g., 100*h*), or a data transfer count (e.g., 100*h*).

As an optional operation, at least one of operation 308, operation 310, operation 312, or operation 314 may be performed.

In operation 308, the storage device 210 may transmit an RTT UPIU to the host 202 to indicate that it is ready to receive the next data portion. In operation 310, the host 202 may transmit a DATA OUT UPIU including a last portion of the write data to the storage device 210. In operation 312, the storage device 210 may transmit an RTT UPIU to the host 202. In operation 314, the host 202 may transmit a DATA OUT UPIU including a first portion of the write data to the storage device 210. Each of the DATA OUT UPIUs in operations 306, 310, and 314 may further include at least one of a data segment length, a data buffer offset, or a data transfer count for the corresponding data portion.

Recognizing that the DATA OUT UPIU of operation 314 is a last write message, the storage device 210 may transmit a response message (e.g., a RESPONSE UPIU 500) to the host 202 to end the write procedure in operation 316.

Figure 4:
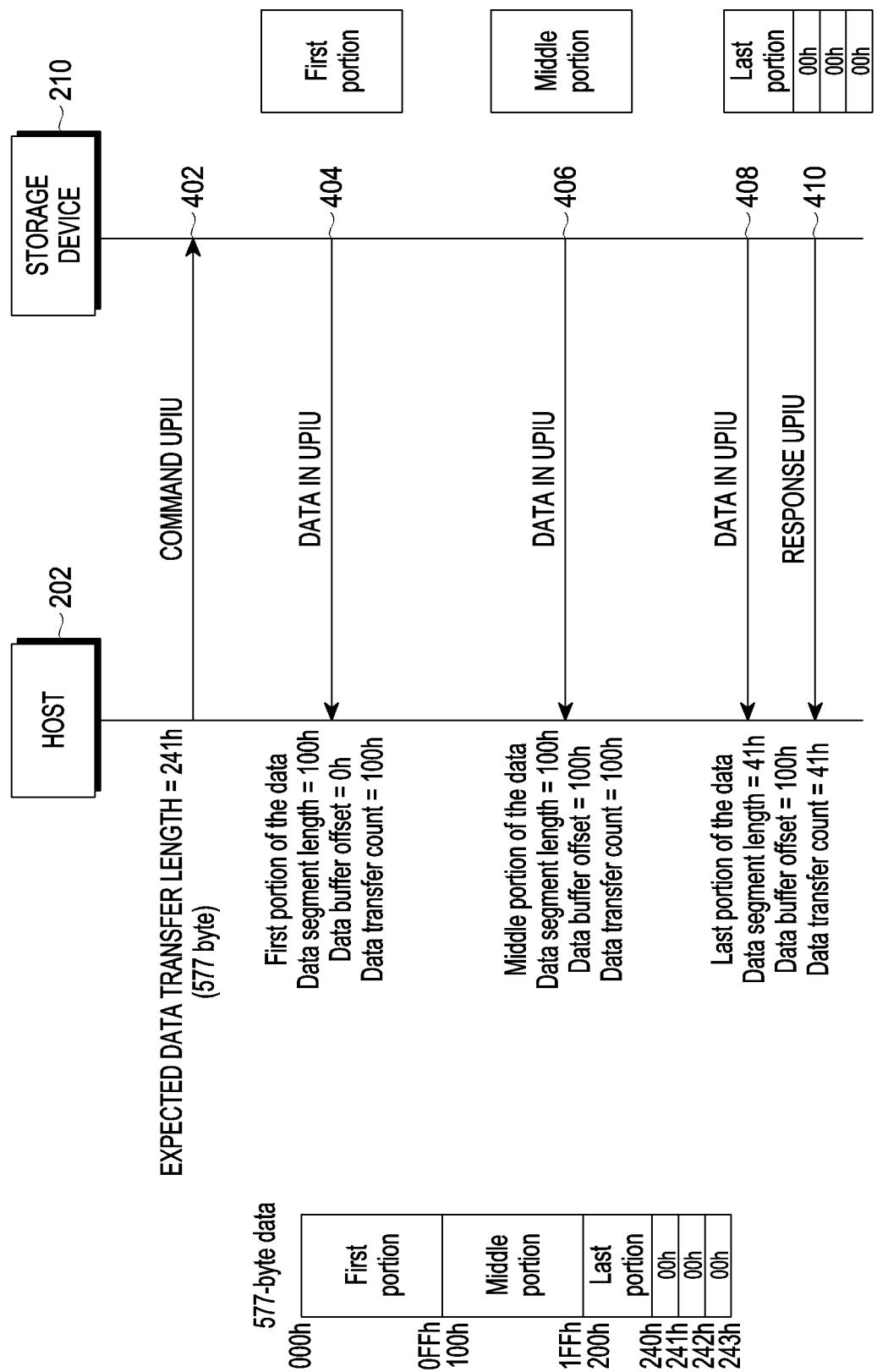
FIG. 4 is a diagram illustrating a message flow for a read procedure in a storage device according to an embodiment of the disclosure.

FIG. 4 is a diagram illustrating a message flow for a read procedure in a storage device according to an embodiment of the disclosure. As an embodiment of the disclosure, the storage device 210 is shown as configured as a UFS, by of example.

Referring to FIG. 4, in operation 402, the host 202 may transmit, to the storage device 210, a COMMAND UPIU as a command message to request read data. The COMMAND UPIU may include an expected data transfer length (e.g., 241 h) of read data (e.g., 577 bytes of data) that the host 202 wants to read from the non-volatile memory 216. In an embodiment of the disclosure, the COMMAND UPIU may include a storage position (e.g., a logical block address) of the read data.

In operation 404, the storage device 210 may transmit a data input message (e.g., a DATA IN UPIU) including at least a portion (e.g., a first portion) of the requested read data to the host 202. As an optional operation, at least one of operation 406 or operation 408 may be performed. In operation 406, the storage device 210 may transmit a DATA IN UPIU including a middle portion of the read data to the host 202. In operation 408, the storage device 210 may transmit a DATA IN UPIU including a last portion of the read data to the host 202. Each of the DATA IN UPIUs of operations 404, 406, and 408 may further include at least one of a data segment length, a data buffer offset, or a data transfer count for the corresponding data portion.

Recognizing that the DATA IN UPIU of operation 408 is a last read message, the storage device 210 may transmit a response message (e.g., the RESPONSE UPIU 500) to the host 202 to end the read procedure in operation 410.

The storage device 210 implemented as a UFS device may support a small computer system interface (SCSI) command set. For example, the COMMAND UPIU in operation 302 or 402 and/or the RESPONSE UPIU in operation 316 or 410 may include an SCSI command set.

FIG. 5 is a diagram illustrating a format of a response message according to an embodiment of the disclosure. While the format of the REPONSE UPIU 500 based on the JEDEC standard available in a UFS device is illustrated as an example of the response message, the response message is not limited to the format. The illustrated RESPONSE UPIU 500 may be used in operation 316 or operation 410.

Referring to FIG. 5, the RESPONSE UPIU 500 may include at least one of a trans type field (e.g., xx10 0001b), a flags field, a logical unit number (LUN) field, a task tag field, an initiator identifier (ID)/command set type (IID/CST) field, a response field, a status field, an extra header segment (EHS) length field, a device information field, a data segment length field, a residual transfer count field, a header end-to-end cyclic redundancy check (E2ECRC) field, a sense data length and sense data field 505, or a data E2ECRC field.

In an embodiment of the disclosure, the sense data field 505 may be configured according to the SCSI standard. When there is a problem in processing a command in the storage device 210 or a special incident occurs in the storage device 210, the storage device 210 may include a specified error code in the sense data field 505 of the RESPONSE UPIU 500. The host 202 may identify the sense data field 505 and perform an additional necessary operation according to the error code.

In the write procedure of FIG. 3, the storage device 210 may store write data from the host 202 in the cache 212 according to a write command in operations 306, 310, and 314, and report a response message indicating write completion to the host 202 (e.g., in operation 316) before all of the write data is written to the non-volatile memory 216. The host 202 may receive the response message of operation 316 from the storage device 210 and determine that the write procedure has been completed. Therefore, an inconsistency error may occur in the host 202.

In embodiments to be described below, the storage device 210 may store information (hereinafter, referred to as cache information) about data remaining in the cache 212 in a storage area (e.g., SRAM or DRAM) that is not cleared even after reset or in a partial area of the non-volatile memory 216. When the storage device 210 identifies that the cache information is stored after device reset, the storage device 210 may report the existence of cache data that has not been flushed to the host 202. The host 202 may perform a consistency check and error correction in response to the report.

Figure 6:
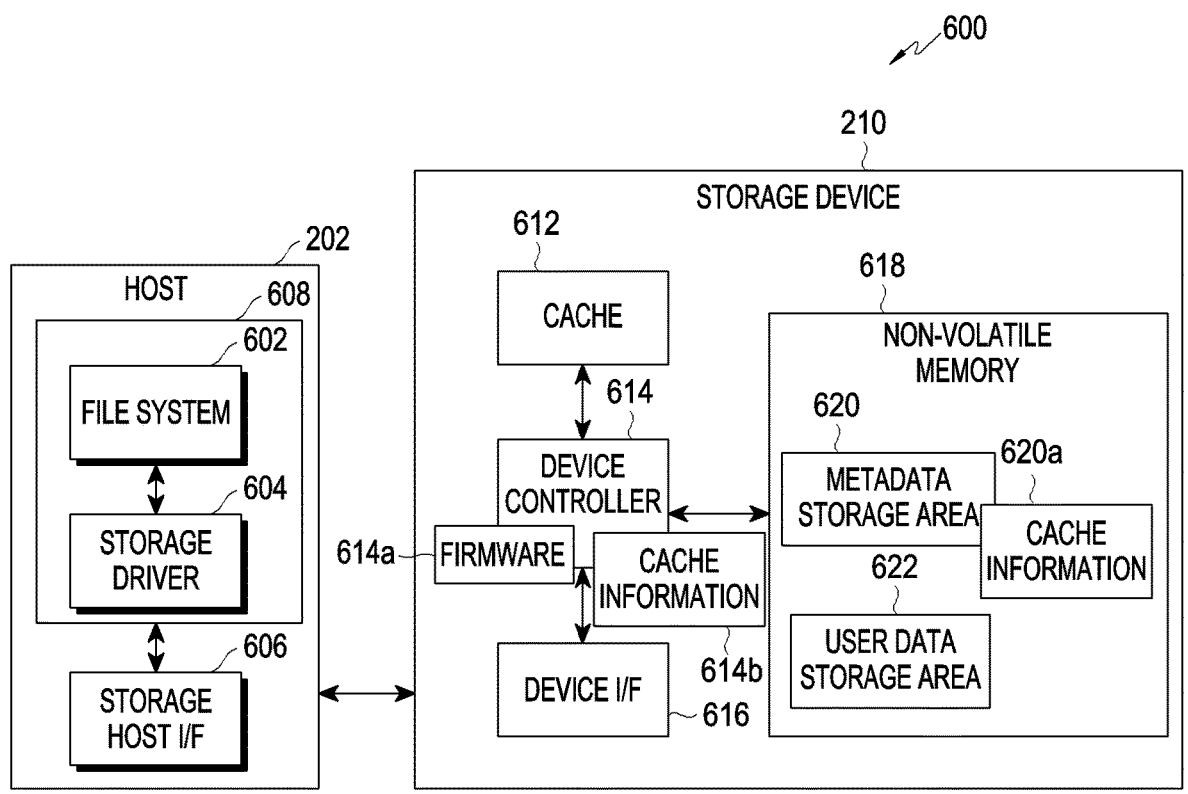
FIG. 6 is a block diagram illustrating a configuration of a storage system that manages cache loss according to an embodiment of the disclosure.

FIG. 6 is a block diagram illustrating a configuration of a storage system for managing cache loss according to an embodiment of the disclosure.

Referring to FIG. 6, a storage system 600 may include the host 202 and the storage device 210. In an embodiment of the disclosure, the storage device 210 may be the memory 130 included in the electronic device 101.

The host 202 may include a processor 608 and a storage host interface (I/F) 606. In an embodiment of the disclosure, the processor 608 may be the processor 120 included in the electronic device 101, for example, an AP implemented as a system on chip (SoC) or an AP chipset. The processor 608 may execute software or program modules, such as a file system 602 and a storage driver 604. The storage host I/F 606 may be a software and/or hardware block responsible for communication with the storage device 210. In an embodiment of the disclosure, the storage host I/F 606 may include a link layer and a physical layer.

In an embodiment of the disclosure, the processor 608 (e.g., the file system 602) may be configured to organize various data generated from an application (not shown) running on the host 202 (e.g., to configure the various data as files), manage the data, and store the data in the storage device 210. In an embodiment of the disclosure, the processor 608 (e.g., the storage driver 604) may be configured to drive the storage device 210. The file system 602 and the storage driver 604 may be implemented, for example, in software or firmware executable by the processor 608.

In an embodiment of the disclosure, the processor 608 (e.g., the storage driver 604) may manage the storage host I/F 606 for communication with the storage device 210. Upon occurrence of an error in communication via the storage host I/F 606 or in the storage device 210, the processor 608 may reset and recover the storage device 210. In an embodiment of the disclosure, the processor 608 (e.g., the storage driver 604) may transmit a reset command to the storage device 210 via the storage host I/F 606. In an embodiment of the disclosure, when receiving a cache loss report from the storage device 210, the processor 608 (e.g., the storage driver 604) may obtain cache information from the storage device 210 and transmit the cache information to the file system 602, so that the file system 602 may perform a consistency check.

In an embodiment of the disclosure, when the storage device 210 is configured to store cache information described below in internal memory (e.g., SRAM or DRAM) of the device controller 614, the processor 608 (e.g., the storage driver 604) may ensure that the cache information stored in the storage device 210 is not deleted by maintaining power supplied to the storage device 210 during device reset of the storage device 210. In an embodiment of the disclosure, when the storage device 210 is configured to store the cache information in a non-volatile memory 618 (e.g., a metadata storage area 620), the processor 608 (e.g., the storage driver 604) may not maintain power supplied to the storage device 210 during reset of the storage device 210.

In an embodiment of the disclosure, the processor 608 (e.g., the storage driver 604) of the host 202 may maintain power supplied to the storage device 210 during device reset of the storage device 210, to ensure that the cache information stored in the storage device 210 is not deleted.

When the processor 608 (e.g., the file system 602) receives a report of information (e.g., cache information) about cache loss of the storage device 210 from the storage driver 604, the processor 608 may perform a consistency check for the storage device 210, and recover and correct an inconsistency error detected in the storage device 210. In an embodiment of the disclosure, as cache loss is detected, the processor 608 may perform a consistency check and error correction on the file system 602 according to an OS.

The storage device 210 may include a cache 612, a device controller 614 (for example, at least one processor), a device I/F 616, and the non-volatile memory 618. The device I/F 616 may be a software and/or hardware block responsible for communication with the host 202. In an embodiment of the disclosure, the device I/F 616 may include a link layer and a physical layer.

The non-volatile memory 618 may store data from the host 202 and output the stored data to the host 202, under the control of the device controller 614. In an embodiment of the disclosure, the non-volatile memory 618 may include the metadata storage area 620 and a user data storage area 622. The metadata storage area 620 may store metadata for firmware 614a executed by the device controller 614 of the storage device 210. The user data storage area 622 may store user data in response to a write request from the host 202.

The device controller 614 may execute the firmware 614a responsible for device management and communication with the host 202. In an embodiment of the disclosure, the device controller 614 may store data (e.g., firmware metadata) generated by the execution of the firmware 614a in the metadata storage area 620 or internal memory (not shown). In an embodiment of the disclosure, the device controller 614 may include memory (not shown) (e.g., SRAM or DRAM (hereinafter referred to as SRAM/DRAM)) available for the firmware 614a.

The cache 612 may share the internal memory (e.g., SRAM/DRAM) used by the device controller 614, or may be configured as separate memory. The cache 612 may temporarily store data to be stored in the non-volatile memory 618 of the storage device 210 or temporarily store data read from the non-volatile memory 618, under the control of the device controller 614.

The device controller 614 may flush data stored in the cache 612 to the non-volatile memory 618 in response to an explicit flush request from the host 202. In an embodiment of the disclosure, the device controller 614 may store information (hereinafter, referred to as cache information) about data (hereinafter, referred to as cache data) which remains in the cache 612 without being flushed. In an embodiment of the disclosure, the cache information may be cache information 614b stored in the internal memory of the device controller 614. To this end, the internal memory of the device controller 614 may be configured not to be cleared by device reset. In an embodiment of the disclosure, the cache information may be cache information 620a stored in the metadata storage area 620 of the non-volatile memory 618.

When the data stored in the cache 612 is flushed to the non-volatile memory 618, the cache information may be deleted by the device controller 614. In an embodiment of the disclosure, the cache information may include at least one of a start address or a data size of write data provided from the host 202. In an embodiment of the disclosure, the device controller 614 may generate the cache information including the start address and the data size obtained from a write command (e.g., the COMMAND UPIU in operation 302) received from the host 202, and store the cache information in the internal memory or the metadata storage area 620 of the non-volatile memory 618.

In an embodiment of the disclosure, the device controller 614 may perform device reset, when it receives a reset command from the host 202 via the device I/F 616 or after it determines that device reset is necessary and reports the need of the device reset to the host 202. In an embodiment of the disclosure, the device controller 614 may reset at least one of a plurality of components (e.g., the cache 612, the device controller 613, the device I/F 616, and the non-volatile memory 618) of the storage device 210 by the device reset.

When the storage device 210 is reset, the device controller 614 may identify whether cache information exists in the internal memory or the metadata storage area 620 of the non-volatile memory 618. In the presence of the cache information, the device controller 614 may report information indicating that there is cache loss (e.g., the RESPONSE UPIU 500) to the host 202, determining that the cache loss has occurred.

Figure 7:
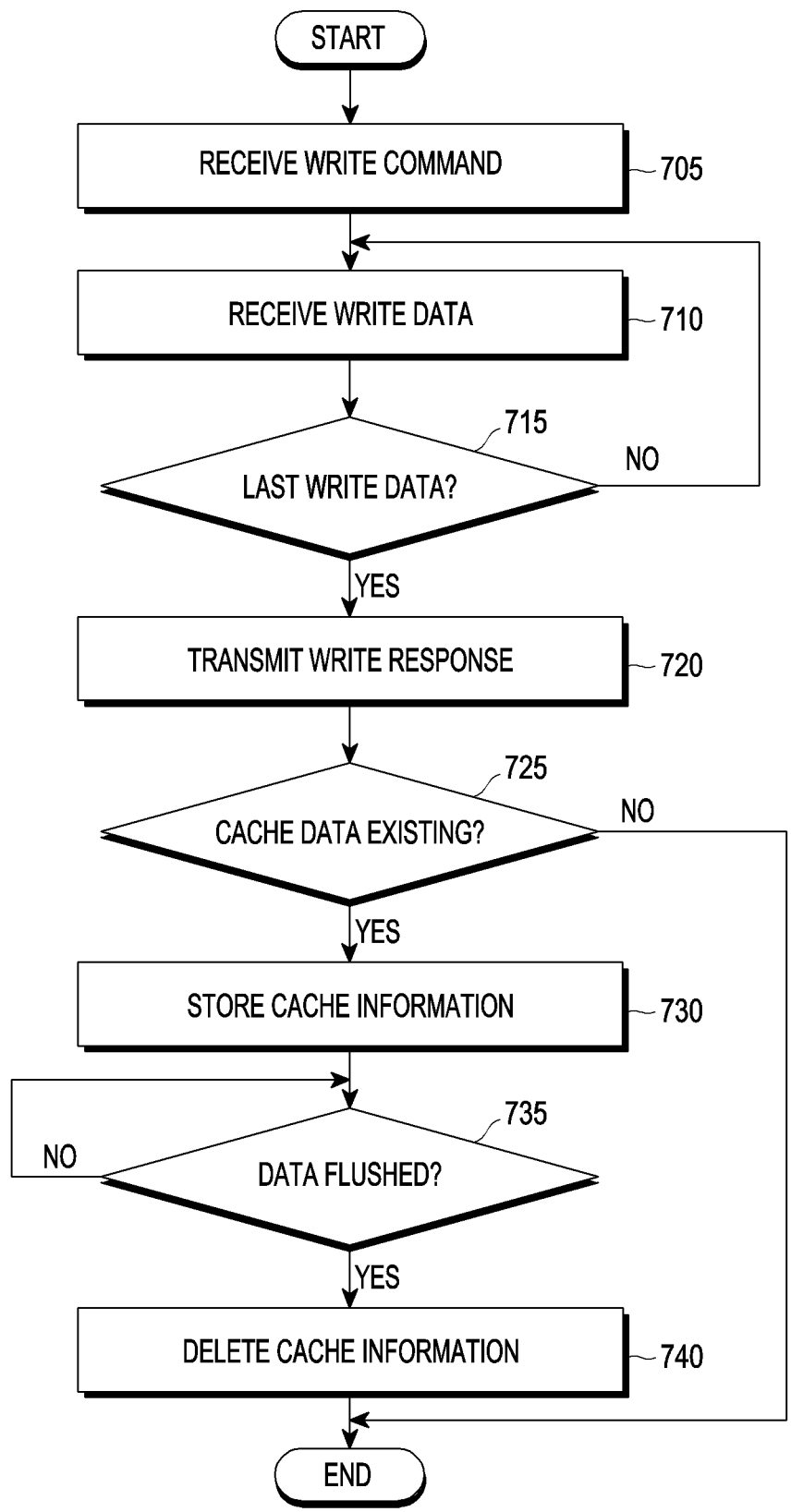
FIG. 7 is a flowchart illustrating a procedure of managing cache information in a storage device according to an embodiment of the disclosure.

FIG. 7 is a flowchart illustrating a procedure of managing cache information in the storage device according to an embodiment of the disclosure. In an embodiment of the disclosure, the illustrated procedure may be performed by the device controller 614 of the storage device 210.

Referring to FIG. 7, in operation 705, the storage device 210 may receive a write command message (e.g., the COMMAND UPIU of operation 302) from the host 202. In operation 710, the storage device 210 may receive a data write message (e.g., the DATA OUT UPIU of operation 306, 310, or 314) including at least a portion of write data to be stored in the non-volatile memory 618. The storage device 210 may temporarily store the at least portion of the write data in the cache 612 before storing it in the non-volatile memory 618.

In operation 715, the storage device 210 may determine whether the data write message includes a last portion of the write data or, for example, whether the write procedure has been completed. When the last portion of the write data is received, the storage device 210 may proceed to operation 720. Otherwise, the storage device 210 may return to operation 710.

In operation 720, the storage device 210 may transmit a write response message (e.g., the RESPONSE UPIU of operation 316) to the host 202 to indicate that the write procedure has been completed.

In operation 725, after transmitting the write response message, the storage device 210 may determine whether at least some data (referred to as cache data) that has not been flushed to the non-volatile memory 618 among the write data remains in the cache 612. In the presence of cache data in the cache 612, the storage device 210 may proceed to operation 730. Otherwise, the storage device 210 may end the operation.

In operation 730, the storage device 210 may generate cache information related to the write data (i.e., the cache data) remaining in the cache 612, and store the cache information. In an embodiment of the disclosure, the cache information may include a start address and a data size associated with the write data remaining in the cache 612. In an embodiment of the disclosure, the cache information may be stored in the internal memory (e.g., SRAM or DRAM) of the device controller 614 or the metadata storage area 620 of the non-volatile memory 618 (e.g., NAND flash memory). In an embodiment of the disclosure, the cache information may be stored in a storage area that is not cleared, even when device reset of the storage device 210 is performed.

In operation 735, the storage device 210 may determine whether the cache data remaining in the cache 612 has been flushed, that is, whether the cache data has been stored in the non-volatile memory 618. When the cache data has not been flushed, the storage device 210 may repeat operation 735. On the contrary, when the cache data has been flushed, the storage device 210 may delete cache information related to the cache data in operation 740.

Figure 8:
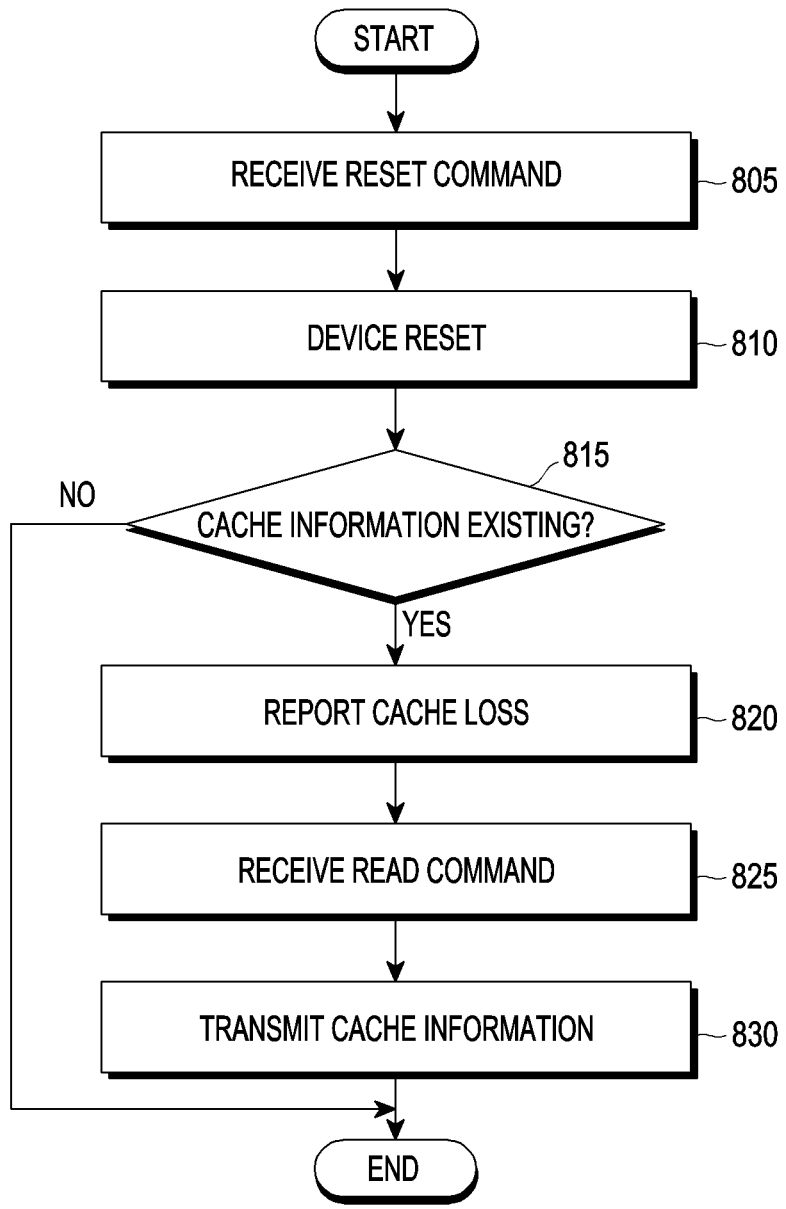
FIG. 8 is a flowchart illustrating a procedure of reporting cache loss in a storage device according to an embodiment of the disclosure.

FIG. 8 is a flowchart illustrating a procedure of reporting cache loss in a storage device according to an embodiment of the disclosure. In an embodiment of the disclosure, the illustrated procedure may be executed by the device controller 614 of the storage device 210.

Referring to FIG. 8, in operation 805, the storage device 210 may receive a reset command from the host 202. In an embodiment of the disclosure, the storage device 210 may determine to execute power-on reset, hardware reset, or software reset. In operation 810, the storage device 210 may perform device reset according to the reset command.

In operation 815, the storage device 210 may determine whether cache information exists in a specified storage area, after the device reset is completed. In an embodiment of the disclosure, the storage device 210 may identify whether the cache information is stored in the internal memory of the device controller 614 or the metadata storage area 620 of the non-volatile memory 618. In an embodiment of the disclosure, the cache information may include a start address and/or a data size of write data remaining in the cache 612. In the presence of the cache information, the storage device 210 may proceed to operation 820. On the contrary, in the absence of the cache information, the storage device 210 may end the operation.

In operation 820, the storage device 210 may transmit a response message (e.g., the RESPONSE UPIU 500 of FIG. 5) to the host 202 to indicate cache loss after the device reset. In an embodiment of the disclosure, the response message may be a status message or a data message transmitted according to a status request message (e.g., a TUR UPIU or an SCSI READ command) from the host 202. A specific example will be described below.

In an embodiment of the disclosure, after the device reset, the host 202 may download a boot code from the storage device 210. For example, the host 202 may transmit a TEST UNIT READY (TUR) UPIU to the storage device 210. The storage device 210 may transmit a status message in response to the TUR UPIU. The host 202 may determine whether a boot logical unit (LU) or a boot well-known LU of the storage device 210 is accessible based on status information included in the status message.

When the boot LU is accessible, the host 202 may transmit an SCSI READ command to the storage device 210. In an embodiment of the disclosure, the SCSI READ command may correspond to the boot LU. The storage device 210 may transmit a data message and a status message to the host 210 in response to the SCSI READ command.

In an embodiment of the disclosure, the storage device 210 may include information indicating that the cache information is stored or the storage device 210 has cache loss after the device reset, in the data message or the status message transmitted to the host 210.

In an embodiment of the disclosure, the storage device 210 may include a specified value, for example, a value (e.g., 06 h) indicating that the storage device 210 has been reset in a sense data field (e.g., the sense data field 505) of a response message (e.g., the RESPONSE UPIU 500 of FIG. 5) transmitted to the host 210, and include an additional sense code/additional sense code qualifier (ASC/ASCQ) in the sense data filed 505. In an embodiment of the disclosure, the ASC may include information about an error reported by a sense key field. In an embodiment of the disclosure, the ASCQ may indicate detailed information related to an additional sense code. In an embodiment of the disclosure, the storage device 210 may report the cache loss to the host 202 by setting a given value indicating that there is cache loss in an ASC/ASCQ field of the response message transmitted to the host 210.

The following Table 1 illustrates values set in the sense key field.

TABLE 1

| Sense Key | |
|---|---|
| Value | Description |
| 06h | UNIT ATTENTION - indicates that the unit has been reset or unexpectedly powered-on or that removable media has changed. |

In operation 825, the storage device 210 may receive a read command message (e.g., the COMMAND UPIU of operation 402) requesting the cache information from the host 202. In an embodiment of the disclosure, the read command message may include information of a read request related to the cache information. In an embodiment of the disclosure, the information of the read request included in the read command message may be related to the internal memory of the device controller 614 or the non-volatile memory 618. In an embodiment of the disclosure, the read command message may include information of a read buffer command.

In operation 830, the storage device 210 may transmit the cache information to the host 202 in response to the read command message. In an embodiment of the disclosure, the cache information may be included in a data input message (e.g., the DATA IN UPIU of operation 404, operation 406, or operation 408) corresponding to the read command message, and transmitted to the host 202.

Figure 9:
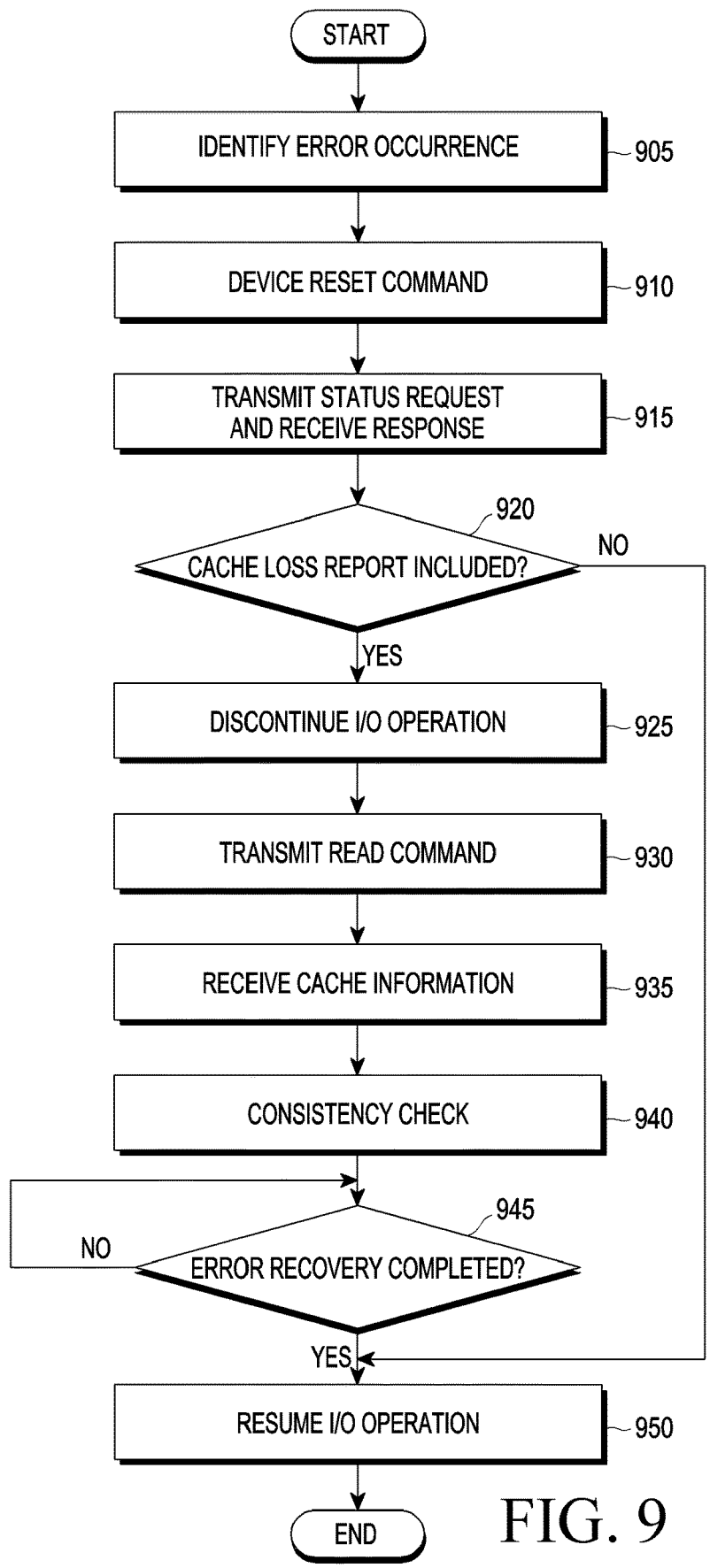
FIG. 9 is a flowchart illustrating a procedure of managing cache loss in a host according to an embodiment of the disclosure.

FIG. 9 is a flowchart illustrating a procedure for managing cache loss in a host according to an embodiment of the disclosure. In one embodiment of the disclosure, the illustrated procedure may be executed by the processor 608 (e.g., the storage driver 604) of the host 202.

Referring to FIG. 9, in operation 905, the host 202 may identify that an error has occurred in the interface between the host 202 and the storage device 210 or in the storage device 210. In an embodiment of the disclosure, the host 202 may determine that device reset of the storage device 210 is required according to the error occurrence.

In operation 910, the host 202 may reset the storage device 210. In an embodiment of the disclosure, the host 202 may cause the storage device 210 to be reset by transmitting a reset command to the storage device 210. In an embodiment of the disclosure, the processor 608 (e.g., the storage driver 604) of the host 202 may maintain power supplied to the storage device 210 during the device reset of the storage device 210, to ensure that cache information stored in the cache is not deleted.

In operation 915, the host 202 may transmit a status request message (e.g., a TUR UPIU or an SCSI READ command) to the storage device 210 according to the device reset of the storage device 210, and receive a response message (e.g., the RESPONSE UPIU 500 of FIG. 5) corresponding to the status request message from the storage device 210.

In operation 920, the host 202 may determine whether information (e.g., ASC/ASCQ in the sense data field 505) indicating cache loss in the storage device 210 is included in the response message. When the information indicating cache loss is not included, the host 202 may perform a data input/output (I/O) operation for the storage device 210 (e.g., the write procedure of FIG. 3 and the read procedure of FIG. 4) in operation 950. On the contrary, when the information indicating cache loss is included, for example, when the ASC/ASCQ in the sense data field 505 is set to a predetermined value, the host 202 may proceed to operation 925.

In operation 925, the host 202 may suspend the data I/O operation for the storage device 210. In an embodiment of the disclosure, the processor 608 (e.g., the storage driver 604) of the host 202 may hold a data write and/or read request from the file system 602 or request the file system 602 to suspend writing and/or reading data.

In operation 930, the host 202 may transmit, to the storage device 210, a read command message (e.g., the COMMAND UPIU in operation 402) to request cache information related to the cache loss. In an embodiment of the disclosure, the read command message may include information (e.g., a read buffer command) of a read request related to the cache information. In an embodiment of the disclosure, the information of the read request included in the read command message may be related to the internal memory of the device controller 614 or the non-volatile memory 618.

In operation 935, the host 202 may receive a data input message (e.g., the DATA IN UPIU in operation 404, operation 406, or operation 408 of FIG. 4) including the cache information from the storage device 210. In an embodiment of the disclosure, the cache information may include a start address and a data size associated with write data that the host 202 has requested to be written but has not been stored in the non-volatile memory 618 of the storage device 210.

In operation 940, the host 202 may perform consistency error detection, error correction, and recovery by performing a consistency check on the storage device 210 based on the cache information. In an embodiment of the disclosure, the processor 608 (e.g., the storage driver 604) of the host 202 may provide the cache information obtained from the storage device 210 to the file system 602, and the processor 608 (e.g., the file system 602) may perform a consistency check based on the cache information. In an embodiment of the disclosure, the processor 608 (e.g., the storage driver 604) may transmit information indicating the device reset and/or the cache loss of the storage device 210 to the file system 602, together with the cache information.

In an embodiment of the disclosure, the consistency check may include detecting a consistency error at a start address indicated by the cache information, and correcting and recovering the error. Since specific details of the consistency check are not related to the embodiments of the disclosure, their detailed description will be avoided. In an embodiment of the disclosure, the processor 608 (e.g., the file system 602) may notify the storage driver 604 that error correction and recovery according to the consistency check has been completed.

In operation 945, the host 202 may determine whether error recovery has been completed through the consistency check. In an embodiment of the disclosure, the processor 608 (e.g., the storage driver 604) of the host 202 may identify whether a signal indicating completion of the error recovery has been received from the file system 602. When the error check has not been completed, the processor 608 may return to operation 945. On the contrary, when the error check has been completed, the processor 608 may perform operation 950.

In operation 950, the host 202 may resume the data I/O operation (e.g., the write procedure of FIG. 3 or the read procedure of FIG. 4) for the storage device 210. In an embodiment of the disclosure, the processor 608 (e.g., the storage driver 604) of the host 202 may process the pending data write and/or read request again or request the file system 602 to resume to write and/or read data.

Figure 10:
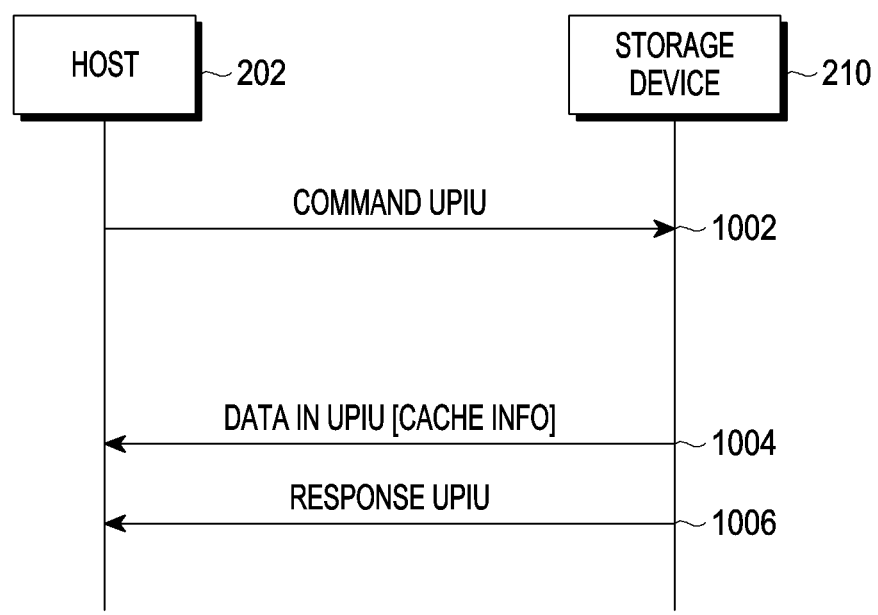
FIG. 10 is a diagram illustrating a message flow for a procedure of reporting cache information to a host by a storage device according to an embodiment of the disclosure.

FIG. 10 is diagram illustrating a message flow for a procedure of reporting cache information to a host by a storage device according to an embodiment of the disclosure. In an embodiment of the disclosure, the illustrated procedure may correspond to operation 830 or operation 935.

Referring to FIG. 10, in operation 1002, the host 202 may transmit, to the storage device 210, a COMMAND UPIU as a command message to requesting information (e.g., cache information) related to cache loss, stored in the storage device 210. In an embodiment of the disclosure, the COMMAND UPIU may be an SCSI-based read buffer command to read cache information stored in the storage device 210, and the read buffer command may include information indicating buffer read (e.g., 0x3c). In an embodiment of the disclosure, the COMMAND UPIU may include information about a storage area in which the cache information is stored in the storage device 210.

In operation 1004, the storage device 210 may transmit a data input message (e.g., DATA IN UPIU) including the requested cache information to the host 202. In an embodiment of the disclosure, the cache information may be delivered to the host 202 through at least one data input message. In an embodiment of the disclosure, the cache information may include a start address and/or a data size. The start address and/or the data size may be related to write data that the host has requested to be written but that has not been stored in the non-volatile memory 618 of the storage device 210.

In operation 1006, the storage device 210 may transmit a read response message (e.g., the RESPONSE UPIU 500) to the host 202, thereby completing the procedure of transmitting cache information.

An apparatus and an operation method thereof according to embodiments of the disclosure may reduce consistency errors in a host, caused by reset of a storage device.

An apparatus and an operation method thereof according to embodiments of the disclosure may enable a host to immediately perform a consistency check and error correction, upon occurrence of cache loss. Therefore, consistency errors and user data loss may be reduced, and mount failure or booting failure caused by a file system panic or metadata corruption may be prevented.

According to an embodiment of the disclosure, the host 202 for managing the storage device 210 may include the storage host interface 606 configured to communicate with the storage device 210 comprising a cache 612 and a non-volatile memory 618, and the processor 608 operatively coupled with the storage host interface. The processor may be configured to receive information indicating cache loss from the storage device after device reset of the storage device. The processor may be configured to suspend a data input/output operation for the storage device in response to the information indicating cache loss. The processor may be configured to transmit a buffer read command to the storage device. The processor may be configured to receive, from the storage device, cache information related to data remaining in the cache without being stored in the non-volatile memory before the device reset based on the buffer read command.

According to an embodiment of the disclosure, the processor may be configured to identify occurrence of an error related to the storage device, transmit a reset command indicating the device reset to the storage device through the storage host interface according to the identification of the occurrence of the error, and wait for reception of the information indicating the cache loss from the storage device, after transmitting the reset command.

According to an embodiment of the disclosure, the cache information may include a start address and/or a data size related to the data remaining in the cache.

According to an embodiment of the disclosure, the processor may be configured to perform a consistency check for the storage device based on the cache information.

According to an embodiment of the disclosure, the processor may be configured to maintain power supplied to the storage device during the device reset of the storage device.

According to an embodiment of the disclosure, the processor may be configured to transmit a status request message to the storage device, after the device reset, and receive, from the storage device, a response message including the information indicating the cache loss in response to the status request message. The information indicating the cache loss may be a sense key field and an ASC/ASCQ included in a sense data field in the response message.

According to an embodiment of the disclosure, the storage device 210 may include the cache 612, the non-volatile memory 618, the device interface 616 configured to communicate with the host 202, and the device controller 614 operatively coupled with the cache, the non-volatile memory, and the device interface. The device controller may be configured to receive a reset command from the host through the device interface. The device controller may be configured to perform device reset in response to the reset command. The device controller may be configured to determine whether there is cache information related to data remaining in the cache without being stored in the non-volatile memory before the device reset. The device controller may be configured to, in the presence of the cache information, transmit information indicating cache loss to the host through the device interface. The device controller may be configured to receive a read command for the cache information from the host through the device interface after transmitting the information indicating cache loss. The device controller may be configured to transmit the cache information to the host through the device interface in response to the read command.

According to an embodiment of the disclosure, the cache information may include a start address and/or a data size related to the data remaining in the cache.

According to an embodiment of the disclosure, the device controller may be configured to receive a write command from the host through the device interface, receive at least a portion of write data corresponding to the write command from the host, transmit, to the host, a write response message indicating that a write procedure of the write data is completed, determine whether at least some data that is not flushed to the non-volatile memory among the write data remains in the cache, when the at least some data remains in the cache, store the cache information related to the write data, and when the at least some data is flushed to the non-volatile memory, delete the cache information.

According to an embodiment of the disclosure, the cache information may be stored in internal memory of the device controller or a metadata storage area of the non-volatile memory.

According to an embodiment of the disclosure, the internal memory of the device controller may be configured such that the cache information is not deleted by the device reset of the storage device.

According to an embodiment of the disclosure, the device controller may be configured to transmit, to the host, the information indicating the cache loss in a response message corresponding to a command message received from the host after the device reset. The information indicating the cache loss may be a sense key field and an ASC/ASCQ included in a sense data field in the response message.

According to an embodiment of the disclosure, a method of operating the host 202 for managing the storage device 210 including the cache 612 and the non-volatile memory 618 may include receiving information indicating cache loss from the storage device after device reset of the storage device in operations 915 and 920. The method may include suspending a data input/output operation for the storage device in response to the information indicating cache loss in operation 925. The method may include transmitting a buffer read command to the storage device in operation 930. The method may include receiving, from the storage device, cache information related to data remaining in the cache without being stored in the non-volatile memory before the device reset based on the buffer read command in operation 935.

According to an embodiment of the disclosure, the method may further include identifying occurrence of an error related to the storage device, transmitting a reset command indicating the device reset to the storage device according to the identification of the occurrence of the error, and waiting for reception of the information indicating the cache loss from the storage device, after transmitting the reset command.

According to an embodiment of the disclosure, the cache information may include a start address and/or a data size related to the data remaining in the cache.

According to an embodiment of the disclosure, the method may further include performing a consistency check for the storage device based on the cache information in operation 940.

According to an embodiment of the disclosure, the method may further include maintaining power supplied to the storage device during the device reset of the storage device.

According to an embodiment of the disclosure, receiving the information indicating the cache loss may include transmitting a status request message to the storage device, after the device reset, and receiving, from the storage device, a response message including the information indicating the cache loss in response to the status request message. The information indicating the cache loss may be a sense key field and an ASC/ASCQ included in a sense data field in the response message.

According to an embodiment of the disclosure, a method of operating the storage device 210 including the cache 612 and the non-volatile memory 618 may include receiving a reset command from a host in operation 805. The method may include performing device reset in response to the reset command in operation 810. The method may include determining whether there is cache information related to data remaining in the cache without being stored in the non-volatile memory before the device reset in operation 815. The method may include, in the presence of the cache information, transmitting information indicating cache loss to the host in operation 820. The method may include receiving a read command for the cache information from the host after transmitting the information indicating cache loss in operation 825. The method may include transmitting the cache information to the host in response to the read command in operation 830.

According to an embodiment of the disclosure, the cache information may include a start address and/or a data size related to the data remaining in the cache.

According to an embodiment of the disclosure, the method may further include receiving a write command from the host in operation 705, receiving at least a portion of write data corresponding to the write command from the host in operation 710, transmitting, to the host, a write response message indicating that a write procedure of the write data is completed in operation 720, determining whether at least some data that is not flushed to the non-volatile memory among the write data remains in the cache in operation 725, when the at least some data remains in the cache, storing the cache information related to the write data in operation 730, and when the at least some data is flushed to the non-volatile memory, deleting the cache information in operation 740.

According to an embodiment of the disclosure, the cache information may be stored in internal memory of the storage device or a metadata storage area of the non-volatile memory.

According to an embodiment of the disclosure, the internal memory may be configured, such that the cache information is not deleted by the device reset of the storage device.

According to an embodiment of the disclosure, reporting the information indicating the cache loss may include transmitting, to the host, the information indicating the cache loss in a response message corresponding to a command message received from the host after the device reset. The information indicating the cache loss may be a sense key field and an ASC/ASCQ included in a sense data field in the response message.

The electronic device according to various embodiments of the disclosure may be one of various types of electronic devices. The electronic devices may include, for example, a computer device, a portable communication device (e.g., a smartphone), a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in various embodiments of the disclosure, the term "module" may include a unit implemented in hardware, software, or firmware, and may interchangeably be used with other terms, for example, logic, logic block, part, or circuitry. A module may be a single integral component, or a minimum unit or part thereof, adapted to perform one or more functions. For example, according to an embodiment, the module may be implemented in a form of an application-specific integrated circuit (ASIC).

Various embodiments of the disclosure as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term 'non-transitory' simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to an embodiment of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to an embodiment, one or more of the above-described components may be omitted, or one or more other components may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to an embodiment, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the scope of the disclosure as defined by the appended claims and their equivalents.

What is claimed is:

1. A host for managing a storage device, the host comprising:
a storage host interface configured to communicate with the storage device comprising a cache and a non-volatile memory; and
at least one processor operatively coupled with the storage host interface,
wherein the at least one processor is configured to:
receive information indicating cache loss from the storage device after device reset of the storage device,
suspend a data input/output operation for the storage device in response to the information indicating cache loss,
transmit a buffer read command to the storage device, and
receive, from the storage device, cache information related to data remaining in the cache without being stored in the non-volatile memory before the device reset, based on the buffer read command.

2. The host of claim 1, wherein the at least one processor is further configured to:
identify occurrence of an error related to the storage device;
transmit a reset command indicating the device reset to the storage device through the storage host interface according to the identification of the occurrence of the error; and
wait for reception of the information indicating the cache loss from the storage device, after transmitting the reset command.

3. The host of claim 1, wherein the cache information includes a start address and/or a data size related to the data remaining in the cache.

4. The host of claim 1, wherein the at least one processor is further configured to perform a consistency check for the storage device based on the cache information.

5. The host of claim 1, wherein the at least one processor is further configured to maintain power supplied to the storage device during the device reset of the storage device.

6. The host of claim 1,
wherein the at least one processor is further configured to:
transmit a status request message to the storage device, after the device reset, and
receive, from the storage device, a response message including the information indicating the cache loss in response to the status request message, and
wherein the information indicating the cache loss is a sense key field and an additional sense code/additional sense code qualifier (ASC/ASCQ) included in a sense data field in the response message.

7. A method of operating a host for managing a storage device including a cache and a non-volatile memory, the method comprising:
receiving information indicating cache loss from the storage device after device reset of the storage device;
suspending a data input/output operation for the storage device in response to the information indicating cache loss;
transmitting a buffer read command to the storage device; and
receiving, from the storage device, cache information related to data remaining in the cache without being stored in the non-volatile memory before the device reset based on the buffer read command.

8. The method of claim 7, further comprising:
identifying occurrence of an error related to the storage device;
transmitting a reset command indicating the device reset to the storage device according to the identification of the occurrence of the error; and
waiting for reception of the information indicating the cache loss from the storage device, after transmitting the reset command.

9. The method of claim 7, wherein the cache information includes a start address and/or a data size related to the data remaining in the cache.

* * * * *